Jan. 3, 1939.                 E. SCHARPENBERG                 2,142,214
                              ARM AND PLATE TONGS
                              Filed June 12, 1937
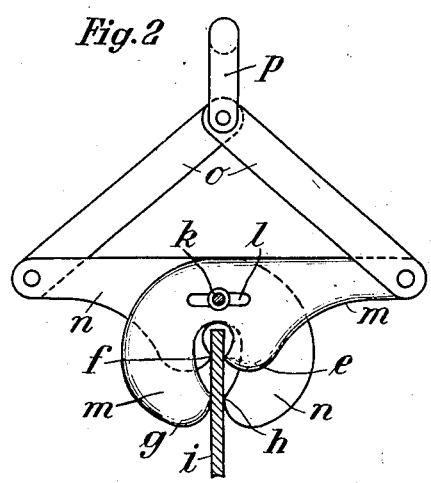
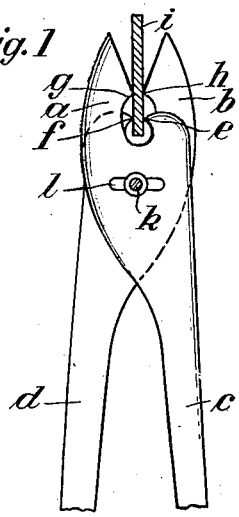
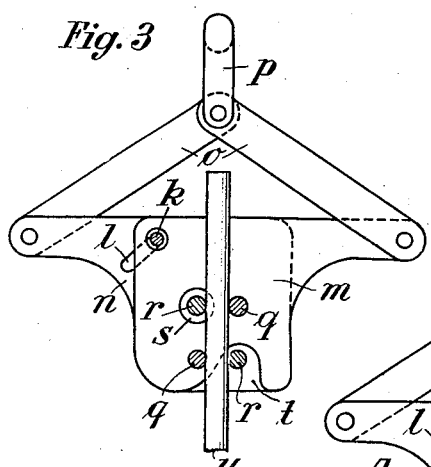
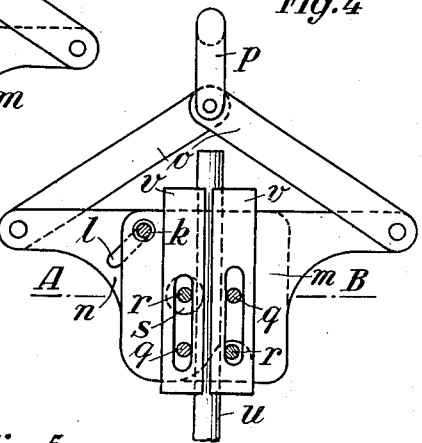
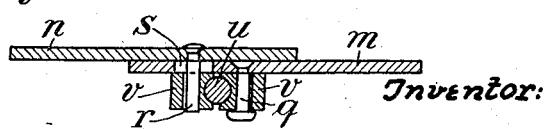
Inventor:
Ewald Scharpenberg Patented Jan. 3, 1939

2,142,214

UNITED STATES PATENT OFFICE 2,142,214

ARM AND PLATE TONGS

Ewald Scharpenberg, Wetter-on-the-Ruhr, Germany

Application June 12, 1937, Serial No. 147,919
In Germany June 23, 1936

3 Claims. (Cl. 294—118)

The invention relates to tongs for carrying sheet metal plates, plates, wires and the like. The tongs are characterized by two arms connected by a pin-and-slot connection, each arm having two jaws or pins adapted to grip the work, the jaws or pins on the opposite arms being mutually displaced so that the work piece is turned on edge. The hinge pin of one of the tongs' arms is shiftable in a slot of the other arm and does not serve, as in the tongs of known type, for transmission of the clamping pressure.

Several embodiments of the invention are illustrated, by way of example, in the accompanying drawing, in which Fig. 1 shows an arm tongs in elevation Figs. 2 to 4 show a plate tongs in elevation and Fig. 5 is a cross section on line A—B of Fig. 4.

The arm-tongs shown in Fig. 1 consists of two similarly shaped arms $a$ and $b$, forming the tongs mouth, and of the handle ends $c$ and $d$. Each one of the arms $a$ and $b$ has a lower jaw $e$ and $f$ respectively, and a jaw $g$, $h$, respectively, in front of each jaw $e$, $f$, respectively, the jaws $e$ and $f$ being displaced relative to the jaws $g$ and $h$ in such a manner that they grip at opposite sides the work piece to be clamped. The clamping effect upon the workpiece $i$ is therefore produced by the turning on edge of the jaws. $k$ is a pin fixed in one of the arms and shiftably engaging in a transverse slit $l$ of the other arm. This arrangement serves to keep together the two arms $a$ and $b$. The tongs' mouth may, in preserving the jaws, have another shape than shown, for instance the shape of tube-tongs.

The plate-tongs shown in Fig. 2 consists of two similar shaped arms $m$ and $n$, the links $o$ and a ring $p$ connecting the links. The arms $m$ and $n$ carry, as in Fig. 1 the lower jaws $e$ and $f$ and the upper jaws $g$ and $h$ in the displaced arrangement as shown in Fig. 1. By a pull exerted upon ring $p$ and therefore on the links $o$ the jaws are pressed against the workpiece and the latter is securely clamped.

To grip works of circular, four or more cornered cross-section, and to clamp the same, it is necessary to equip the tongs' arms $m$ and $n$, as shown in Fig. 3, with mutually displaced pins $q$ and $r$. The pins $q$ being fixed in the one arm situated at the front and the pins $r$ in the other arm situated behind the front arm. The pins $r$ in the last mentioned arm can freely move in an aperture $s$ and in an incision $t$ of the front arm. The work piece $u$ is securely clamped between the pins $q$ and $r$.

Works of circular, four-cornered or multi-cornered cross-section and of soft material as for instance aluminium would be damaged when being clamped between the pins $q$ and $r$. For preventing this damaging, clamping plates $v$ are arranged on the pins $q$ and $r$, as shown in Figs. 4 and 5, and these plates press against the work and clamp the same, the clamping plates having at their facing ends or surfaces moulds corresponding to the cross section of the work piece.

I claim:—

1. Tongs for carrying sheet metal plates, plates, wire and the like, comprising in combination two arms contacting intermediate of their length, two jaws near one end of each of said arms situated one on each side of the central axis of the tongs and adapted to bear from opposite sides against the article to be carried, and each of the jaws on each arm being opposite a jaw on the other arm and forming therewith two pairs of jaws, and a pin and slot connection pivotally and slidably connecting said arms to bring both pairs of jaws into contact with the article.

2. Tongs as specified in claim 1, in which the jaws are formed by two pins projecting from each arm one on each side of the longitudinal axis of the tongs.

3. Tongs as specified in claim 1, in which the jaws are formed by two pins projecting from each arm one on each side of the longitudinal axis of the tongs, the pins on the two arms on each side of the longitudinal axis of the tongs slidably engaging in longitudinal slots in clamping plates adapted to grip the article to be lifted.

EWALD SCHARPENBERG.